United States Patent [19]
Stephens

[11] Patent Number: 5,458,155
[45] Date of Patent: Oct. 17, 1995

[54] SYSTEM AND METHOD FOR SLIPLINER RENOVATION OF SEMI-ELLIPTICAL CONDUITS

[76] Inventor: Patrick J. Stephens, 1276 Chuckanut Dr., Bellingham, Wash. 98225

[21] Appl. No.: 270,363

[22] Filed: Jul. 5, 1994

[51] Int. Cl.⁶ ................................................ F16L 55/18
[52] U.S. Cl. ................ 138/98; 138/97; 138/157; 138/162; 405/151
[58] Field of Search .................. 138/128, 97, 98, 138/157, 156, 162, 166, 100, 101; 405/150.1, 151, 153

[56] References Cited

U.S. PATENT DOCUMENTS

| | | | |
|---|---|---|---|
| 268,571 | 12/1882 | Thompson | 138/98 |
| 442,162 | 12/1890 | Young | 138/157 |
| 633,037 | 9/1899 | Pfahler | 138/98 |
| 1,071,102 | 8/1913 | Shannon | 138/157 |
| 4,812,084 | 3/1989 | Wagner et al. | 405/153 |

*Primary Examiner*—James E. Bryant, III
*Attorney, Agent, or Firm*—Todd N. Hathaway

[57] ABSTRACT

A slipliner for renovating a semi-elliptical conduit such as a masonry sewer line. The bottom of a semi-rigid cylindrical liner pipe is split longitudinally and a floor panel is mounted across the bottom of the pipe to spread the edges of the cut. This bends the lower side walls of the pipe outwardly so that these correspond to the generally vertical side walls of the conduit, while the upper portion of the pipe remains generally cylindrical so as to correspond to the top wall of the conduit and the floor panel corresponds to the generally horizontal bottom wall of the conduit. The slipliner of the present invention is thus much more closely matched in shape to the semi-elliptical conduit than would be a conventional, cylindrical liner.

28 Claims, 3 Drawing Sheets

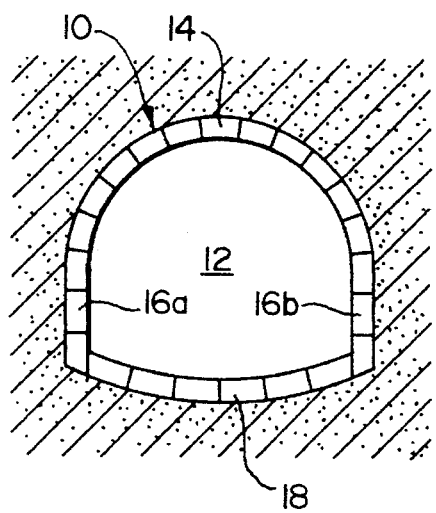
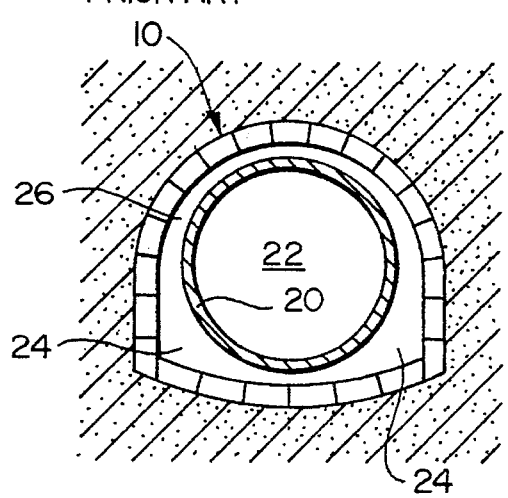
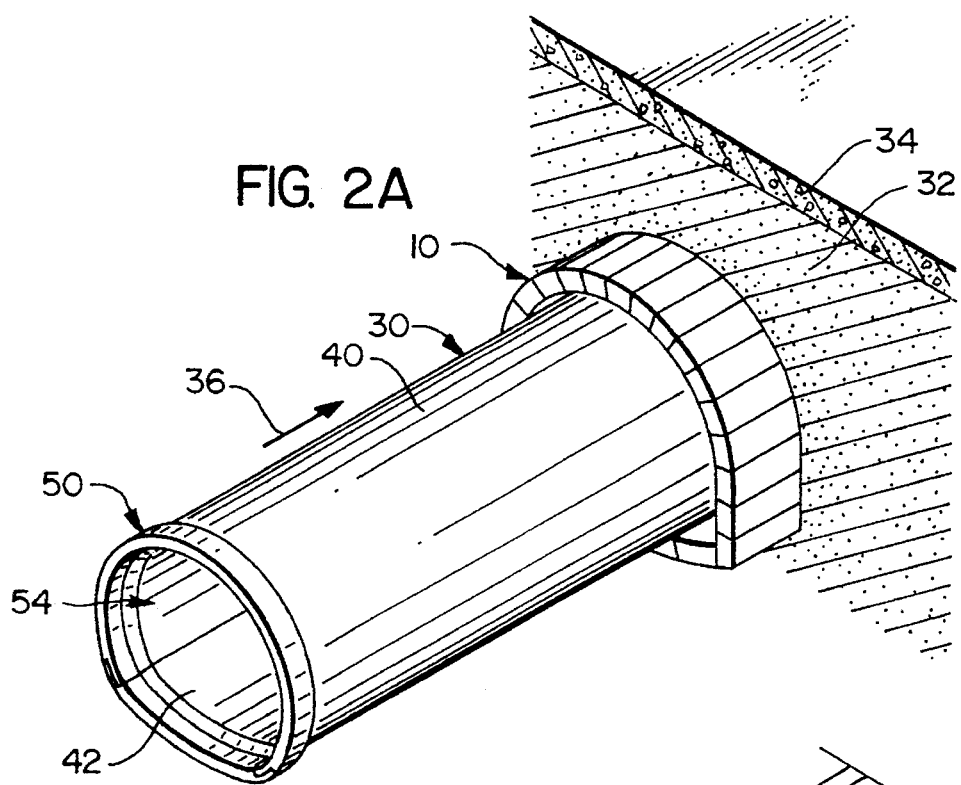
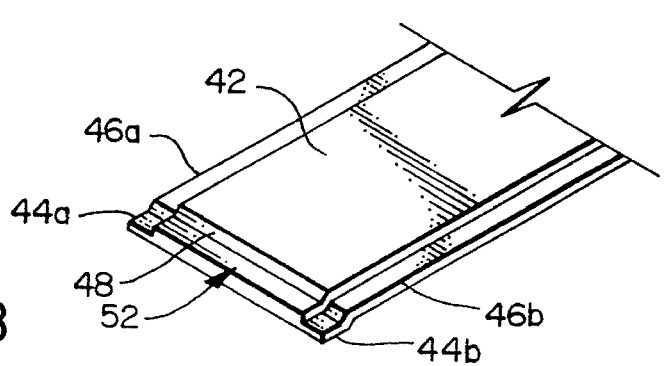

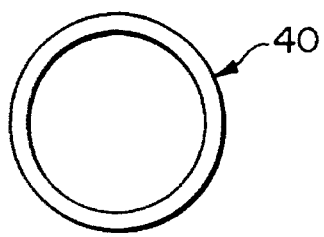
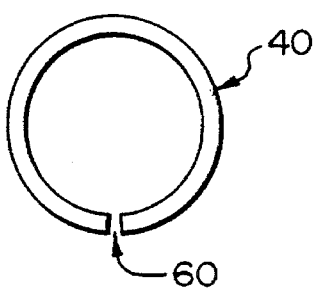
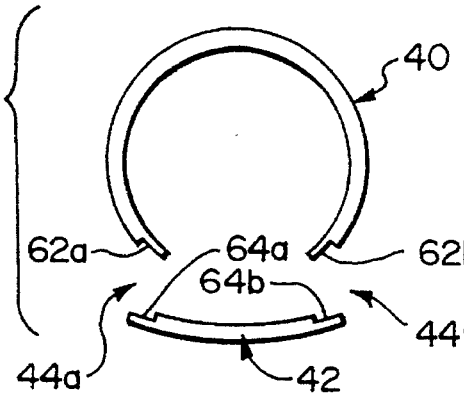
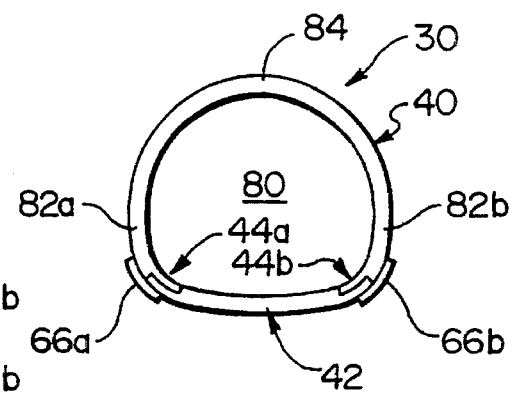
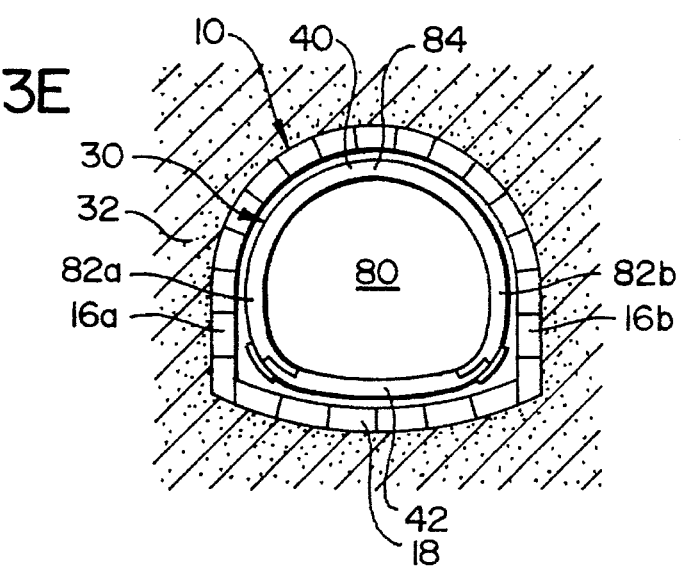

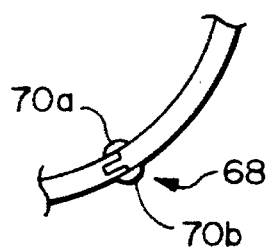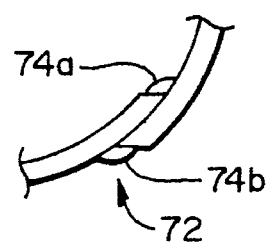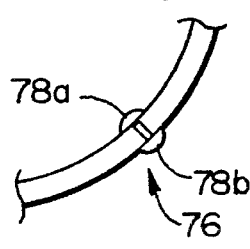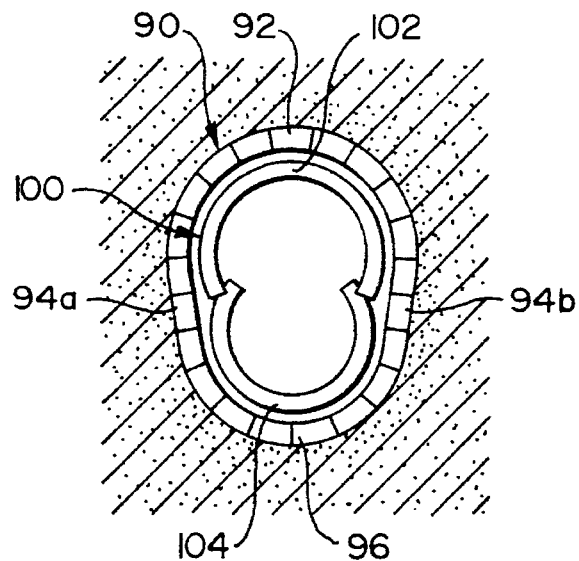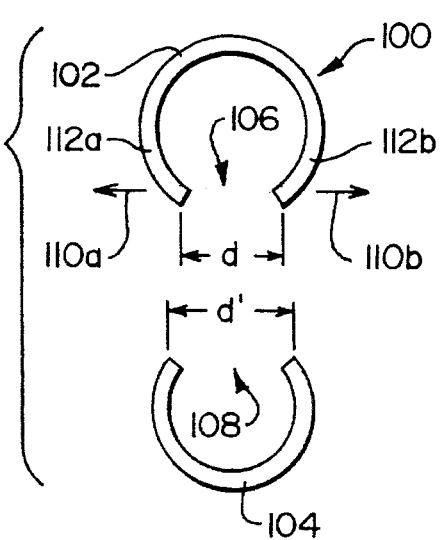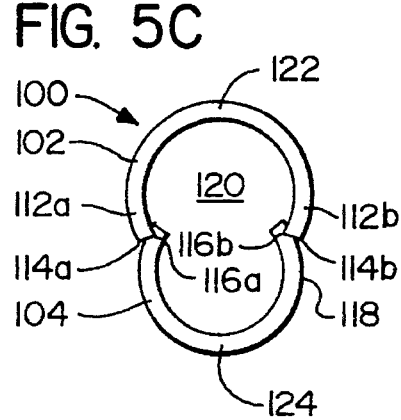

SYSTEM AND METHOD FOR SLIPLINER RENOVATION OF SEMI-ELLIPTICAL CONDUITS

FIELD OF THE INVENTION

The present invention relates generally to the renovation of conduits, such as water lines and sewer lines, and, more particularly, to the renovation of such conduits which are semi-elliptical in cross-section, using a slipliner which is configured to conform to the internal shape of such conduits.

BACKGROUND OF THE INVENTION

Many sewer lines, water lines, and other conduits in use today are in need of renovation. In many cases, this is due to the age of the conduits, being that the materials, such as brick and mortar, tend to deteriorate over time; for example, the walls of sewer lines are often subject to erosion due to the corrosive nature of sewer gases. Also, in some cases the wall of the conduit may have suffered structural failure or have been washed out.

A method for renovating these conduits which has generally met with great success is referred to in the industry as "sliplining." This involves inserting or "jacking" a liner pipe into the bore of the conduit so as to provide a renewed, smooth-walled passage for containing and enhancing the fluid flow. Typically, the liner pipe is formed of a semi-rigid yet resiliently flexible material, such as fiberglass, high-density polyethylene (HDPE), or polyvinyl chloride (PVC) for example. To complete the installation, a cement grout is usually injected into the cavity between the liner pipe and the old conduit.

However, while sliplining has met with considerable success in general, this application has ordinarily been limited to the renovation of conduits which are cylindrical in cross-section. In particular, it has heretofore proven virtually impossible to satisfactorily adapt this technique to the renovation of semi-elliptical conduits, such as are often encountered in older (e.g., 19th century) installations. As can be seen in FIG. 1A, a typical semi-elliptical conduit 10 comprises a tubular bore 12, formed by (a) an upper arch portion 14 which is generally semi-circular in cross-section, (b) somewhat flattened or vertical sidewall portions 16a, 16b, and (c) a generally horizontal floor portion 18, which is often dished or bowed downwardly at the center so as to form "channel" for the fluid. The semi-elliptical conduit thus resembles an inverted "U" in cross-section.

As was noted above, conduits of this type are often found in older installations, such as water and sewer lines in older metropolitan areas, and they are typically constructed of brick or other masonry. As a result, due to both age and the nature of their construction, these conduits are very frequently in need of repair. Unfortunately, conventional sliplining techniques have not proven to be a satisfactory solution.

FIG. 1B illustrates the nature of this problem. In particular, this shows that the shape of a traditional, circular cross-section slipliner 20 is poorly matched to the characteristic inverted "U" shape of a semi-elliptical conduit. This results in large gaps between the two, typically in the corner areas 24 where the floor and sidewalls of the conduit meet, and also along the top 26 of the conduit, where the circular liner pipe typically has a significantly smaller radius than that the of the masonry arch.

This lack of fit leads to several serious problems. Most seriously, the mismatch means that the bore 22 of the liner must be significantly smaller in cross-section than the that of the original semi-elliptical conduit. This means that the capacity of the renovated conduit would be much less than it was to begin with, in some cases down to 50% or less; this reduction of capacity is simply unacceptable in most systems, which are often already strained to their limits. Also, because of the gaps between the liner and the conduit, an excessively large quantity of grout will be required to fill the annular cavity.

Although it is thus apparent that cylindrical liner pipes are not satisfactory for sliplining semi-elliptical conduits, no economical alternative has heretofore existed. In short, owing to the way in which liner pipes are ordinarily manufactured, it is only economical to produce a circular (i.e., cylindrical) shape. For example, a material which is commonly used in sliplining work is Hobas™ fiberglass pipe, available from Hobas USA, Inc., Austin, Tex.; this material is formed by centrifugal casting inside a rotating mold, so that a circular cross-section is the only practical shape. The methods used in the manufacture of PVC and HDPE pipe typically rely on some form of rotary molding as well, and are thus similarly limited to producing a cylindrical shape. Moreover, because the great majority of sliplining jobs call for conventional cylindrical liner pipe, it is simply not economical for pipe manufacturers to make fundamental changes in their production methods in order to fill the relatively limited (although still significant) semi-elliptical conduit market; also, the dimensions and shapes of existing semi-elliptical conduits vary so greatly that it would be difficult or impossible for a manufacturer to provide a series of pipes specifically shaped to correspond to each of these installations.

As a result, the only alternative which has generally been available for renovating semi-elliptical conduits has been a technique which involves in-situ formation of the liner by a chemical process; however, this particular process is excessively expensive and fluid flow through the conduit must be interrupted for the duration of the work, which is usually difficult or impossible to do.

Accordingly, a need exists for an economical technique for allowing conventional liner pipe material to be used in the sliplining renovation of semi-elliptical conduits. Moreover, there is a need for such a technique which does not require excessive investment by a manufacturer in tooling for production of liners which are specially configured to match the shape of such conduits.

SUMMARY OF THE INVENTION

The present invention has solved the problems cited above, and is a method for forming a slipliner for renovating a semi-elliptical conduit having a generally cylindrical top wall, generally vertical sidewalls, and a generally horizontal bottom wall. Broadly, the method comprises the steps of: (a) providing a substantially cylindrical liner pipe formed of a semi-rigid, resiliently flexible material, (b) forming a longitudinal cut along the bottom portion of the pipe, (c) spreading the pipe along the cut so as to form a gap of predetermined width between the first and second edges of the pipe, (d) inserting a substantially planar floor panel having the predetermined width in the gap between the edges of the pipe, and (e) mounting the first and second edges of the pipe to first and second edges of the generally planar floor panel, so that the floor panel provides a bottom surface which corresponds to the generally horizontal bottom wall of the conduit, and lower sidewall portions of the pipe which are adjacent to the floor panel are bent outwardly so as to correspond to the generally vertical sidewall portions of the conduit, while an upper portion of the pipe remains substantially cylindrical so as to correspond to the top wall portion of the conduit.

The bottom wall of the conduit may be downwardly curved toward a middle portion thereof, and the step of inserting the floor panel between the edges of the pipe may comprise providing a generally planar floor panel having a selected degree of flexibility such that the panel bows downwardly in response to an inwardly directed force exerted between the edges of the pipe, so that the panel is provided with a curvature which corresponds to the downwardly curved bottom wall of the conduit. Also, the floor panel may be formed to initially have a curvature which corresponds to the bottom wall of the conduit without being bent outwardly.

The step of mounting the edges of the floor panel to the edges of the pipe may comprise providing each edge of the panel with a joint for receiving a corresponding edge of the pipe in engagement therewith.

The floor panel may be a cast or extruded unit, or may be cut from a sheet of planar material or from another pipe having a diameter larger than that of the liner pipe.

The method of forming the slipliner may further comprise sealing the edges of the pipe to the edges of the floor panel so as to form a fluid-tight bore within the slipliner.

The step of providing a liner pipe formed of a semi-rigid, resiliently flexible material may comprise providing a substantially cylindrical liner pipe formed of fiberglass, polyvinylchloride (PVC), or high density polyethylene (HDPE).

A slipliner for renovating a semi-elliptical conduit is also provided in accordance with the present invention. Broadly, the slipliner comprises: (a) a substantially cylindrical liner pipe formed of a semi-rigid, resiliently flexible material, having a cut formed along a bottom portion thereof, and (b) a generally planar floor panel mounted across the bottom portion of the pipe between first and second edges of the pipe along the cut so that the edges are spread apart by a predetermined distance, so that (c) the floor panel provides a bottom surface which corresponds to the generally horizontal bottom wall of the conduit, and lower sidewall portions of the pipe which are adjacent to the floor panel are bent outwardly so as to correspond to the generally vertical sidewall portions of the conduit while an upper portion of the conduit remains substantially cylindrical so as to correspond to the cylindrical top wall portion of the conduit. Channel means may be mounted to first and second edges of the floor panel for receiving the edges of the pipe in engagement therewith.

The present invention also provides a renovated water line, sewer line, or like conduit, comprising: (a) a semi-elliptical conduit having a generally cylindrical top wall portion, generally vertically extending sidewall portions, and a generally horizontal bottom wall portion, and (b) a slipliner installed concentrically in the semi-elliptical conduit, the slipliner comprising: (i) a substantially cylindrical liner pipe formed of a semi-rigid, resiliently flexible material having a cut formed along a bottom portion thereof, and (ii) a generally planer floor panel mounted across the bottom portion of the pipe between first and second edges thereof along the cut, so that the edges are spread apart by a predetermined distance, so that the floor panel provides a bottom surface which corresponds to the generally horizontal bottom wall of the conduit and lower sidewall portions of the pipe which are adjacent to the floor panel are bent outwardly so as to correspond to the generally vertical sidewall portions of the conduit, while an upper portion of the pipe remains substantially cylindrical so as to correspond to the cylindrical top wall portion of the conduit.

BRIEF DESCRIPTION OF THE DRAWINGS

FIG. 1A is a cross-sectional view of a semi-elliptical conduit illustrating the characteristic inverted "U" configuration;

FIG. 1B is a cross-sectional view similar to FIG. 1A, showing the installation of a conventional, cylindrical liner pipe in the semi-elliptical conduit of FIG. 1A, in accordance with prior art techniques, illustrating the lack of conformity between the two members;

FIG. 2A is a perspective view, illustrating the installation of a liner pipe formed in accordance with the present invention in a semi-elliptical conduit such as that shown in FIG. 1A, the latter having been partially excavated for the purpose of installing the slipliner therein;

FIG. 2B is a partial perspective view of a generally horizontal floor panel which makes up the bottom portion of the liner pipe shown in FIG. 2A;

FIGS. 3A–3E are cross-sectional views illustrating the sequential steps in the fabrication and installation of a liner pipe in accordance with the present invention; and FIG. 4A is a partial, cross-sectional view of the joint between the upper and lower members of the liner pipe, showing this configured as a tongue-and-groove joint;

FIG. 4B is a view similar to FIG. 4A, showing the joint configured as a plain lap joint with seals or welds at the edges of the members;

FIG. 4C is a view similar to FIGS. 4A–4B, showing the joint configured as a butt joint with welds or seals;

FIG. 5A is a cross-sectional view similar to FIG. 3E, showing a liner in accordance with the present invention installed in an "egg-shaped" irregular semi-elliptical conduit; and FIGS. 5B–5C are cross-sectional views illustrating the steps in the fabrication of the liner pipe shown in FIG. 5A, with the upper and lower portions being formed from liner pipes having first and second diameters.

DETAILED DESCRIPTION a. Overview

FIG. 2A provides an overview of the renovation of a buried semi-elliptical conduit 10 using a slipliner pipe 30 in accordance with the present invention. For purposes of illustration, the conduit 10 is shown as a masonry sewer line.

As with conventional sliplining techniques, the first step is to gain access to a section of the conduit 10 by excavating the surrounding earth 32 and overlying pavement 34 or other surrounding material. The top of the conduit is then opened to gain access to the bore 12; the bottom portion of the conduit, however, is generally left in place to provide a "trough" through which the water or other fluid can continue to flow uninterrupted during installation of the liner, although the "trough" is omitted in FIG. 2A in the interest of clarity.

Sections of the liner pipe are lowered into the conduit through the opening and are then jacked longitudinally into the bore, in the direction indicated by arrow 36. As each new section is added, it is mated to the preceding section by means of a suitable connection or connector; for example, as will be described in greater detail below, the exemplary conduit 10 which is shown is provided with a bell-and-spigot construction for mating the ends of the segments, and other connectors include various bands, seals, sealants, couplings, and so forth.

In contrast to prior-art slipliners, however, the slipliner 30 of the present invention is configured to have a shape which closely corresponds to the interior of the semi-elliptical conduit. As will be described in greater detail below, this is achieved by means of a multi-piece structure. The first piece is a section of conventional cylindrical liner pipe 40 which is split longitudinally along the bottom and spread apart to form a lengthwise gap, and the second is a generally planar floor panel 42 which is received in the gap and engages the edges thereof. The sides of the resilient pipe tend to flatten out toward the lower edges where they are spread apart by the floor plate, thus giving this area of the pipe a contour which more closely approximates that of the relatively flat, vertical side walls 16a, 16b (see FIG. 1A) of the conduit.

The relatively horizontal floor panel 42, in turn, extends across the bottom of the pipe and corresponds in shape to the floor portion 18 of the conduit. As will be described in greater detail below, in some embodiments the floor panel may be substantially flat; in others it may be formed of a material and/or sized to have a predetermined degree of flexibility such that it bows outwardly in response to compression of the panel between the two edges of the pipe, giving the floor panel a curved shape which corresponds to the channeled shape of the floor of the conduit, or it may be a substantially rigid member which is formed to have a permanently curved contour which corresponds to the floor of the conduit.

As can be seen in FIG. 2B, the floor panel 42 is an elongate rectangular member, and in this embodiment it has first and second shiplap joints 44a, 44b along its edges which mate with corresponding shiplap joints 46a, 46b formed on the edges of the pipe along the cut. As will be described in greater detail below, however, a satisfactory joint between the pipe and the floor panel may be achieved by means of a number of suitable structures.

As was noted above, the slipliner pipes 30 which are shown use a bell-and-spigot connection. Thus, the trailing end of the segment of pipe 30 which is shown in FIG. 2A is provided with a bellmouth portion 50 which is flared to receive the unflared end of the next segment (not shown). Accordingly, the floor panel 42 in this embodiment is formed with a stepped down portion 52 at its trailing edge which matches the bellmouth portion of the pipe in which it is mounted; the other end of the floor panel is straight and substantially continuous with the main body of the pipe, so that it can be received within the stepped down portion of the floor in the next segment of pipe.

It should be kept in mind, however, that the bell-and-spigot construction which has been described in the preceding paragraph is simply one of several types of end connectors. Each manufacturer tends to use one or two particular types, and there are various couplings, butt joints with sleeves or seals, and so forth in widespread use. The floor panel 42 can thus be provided with whatever end configuration matches that of the particular liner pipe.

From the foregoing it will be understood that the present invention provides a method by which a standard, economically manufactured cylindrical pipe can be modified to provide a slipliner which is suitably configured for installation in a semi-elliptical conduit.

b. Fabrication

Having provided an overview of the present invention, the fabrication of the slipliner pipe will now be described in greater detail with reference to the sequence set forth in FIGS. 3A–3E.

In particular, FIG. 3A shows a standard circular cross-section liner pipe 30. Depending on the manufacturer and model of the pipe, the material of which it is formed is typically a semi-rigid plastic material such as fiberglass, HDPE, or PVC, for example.

As the first step in modifying the standard pipe, a saw cut 60 is formed along what will be the bottom of the slipliner. Then, as is shown in FIG. 3C, the two edges 62a, 62b of the cut are spread apart by the application of force, such as by hydraulic jacks, a spreading mandrel, or other suitable means. The maximum gap which can be formed in this manner will depend on the flexibility and resiliency of the material which is involved, and the thickness (and hence the rigidity) of the wall structure. For example, the Hobas™ fiberglass pipe described above is relatively strong and stiff, yet is also quite resilient. In general, the HDPE material used in Spirolite™ pipe available from Spirolite Corporation, a subsidiary of Chevron Chemical Company, Reno, Nevada, and the PVC material used in Vylon™ slipliner pipe available from Lamson Vylon Pipe, Cleveland, Ohio tend to be somewhat less rigid and more resilient per given wall thickness than the fiberglass material. Moreover, heat or other agents may be used with certain materials (e.g., PVC) to aid in the bending.

Once the edges of the pipe have been spread to the desired separation, the floor panel 42 is moved into position between them. The floor panel 42 may be formed in any suitable and economical manner. For example, the panel may be an extruded member which is formed of PVC or other suitable plastic material and cut to length; this approach has the advantage that the costs of tooling (i.e., the die) are minimal. In other embodiments the floor panel may be formed as a cast member, or may be cut to size from sheets of suitable material. Also, as was noted above, it may be desirable to form the floor panel with an degree of permanent curvature. In those embodiments where the panel is cast or extruded, this may be achieved by forming the mold or die with the desired curvature; in those cases where the panel is cut from stock material, the curvature may be achieved by cutting the panel from a segment of pipe having the appropriate diameter, or by cutting the panel from a sheet of planar material and then bending/forming this to have the desired curvature, as by thermo-forming for example. On the other hand, in those embodiments where it is desired that the floor panel be bowed outwardly to conform to the inner surface of the conduit, the floor panel can be selected to have a flexibility such that it will bow to the desired degree in response to the predetermined inwardly-directed force to which it will be subjected by the edges of the pipe.

As can be seen in FIG. 3D, the two shiplap joints 44a, 44b comprise first and second longitudinally extending cut-away portions or notches 62a, 62b formed along the edges of the upper pipe portion 40, and corresponding notches 64a, 64b formed along the edges of the floor panel 42, which are configured to interfit to form a flush, smooth-sided joint. For additional bonding/strength, the shiplap joints 44a, 44b are overlain with bonded layers 66a, 66b of fiber/resin material; in some embodiments, the external layers or bands may extend completely around the pipe (e.g., in an annular or spiral manner), rather than just along the longitudinal joibts as shown.

In addition to the shiplap joints which have been described above, the joint between the members may have any of a number of other suitable configurations. For example, as can be seen in FIGS. 4A–4C, this may be configured as a tongue-and-groove joint 68 with seals/welds beads 70a, 70b, a plain lap joint 72 with seals/welds 74a, 74b, or a butt joint 76 with seals/welds 78a, 78b, and may be secured by means of fasteners, adhesives, thermal welding, laminations, bands, clamps, and so forth in addition to or in place of the interfitting engagement of the members. The selection of a preferred form of joint will depend in large part on the type of pipe material which is being employed. Also, the grooves, slots, or other joint features may be cut or milled in the edges of the members, or may be formed in a separately extruded/cast channel or joiner piece or the like which is mounted to the edges of the panel/pipe.

Following assembly, the joints between the two members (i.e., between the pipe and the floor panel) are sealed to provide a fluid-tight bore 80. The fluid-tight seal may be established by any suitable means, including use of a sealant/adhesive composition, thermal welding of HDPE/PVC or other plastic members, or use of a gasket/seal element or packing, for example.

After the floor panel 42 has been mounted to the pipe section 40, the jacks or other spreading mechanisms are released so that the resilient force between the two edges 62a, 62b of the pipe is exerted against the edges of the floor panel 42. The resistance of the floor panel, which is thus loaded primarily in compression, results in the lower sidewall areas 82a, 82b of the pipe which are adjacent to the spreader panel being bent outwardly from their original cylindrical configuration, providing a more flat-walled, elliptical shape which corresponds to the wall portions of the conduit; the top portion 84 of the pipe, however, being further from the spreader panel, retains a more or less true cylindrical shape which corresponds to the arch portion of the conduit. In those embodiments where the floor panel 42 is intended to be outwardly flexible, the pressure which is exerted against the edges of the panel 42 cause it to bow outwardly to a predetermined extent such that it generally conforms to the floor portion of the semi-elliptical conduit. As was noted above, however, the floor panel may be provided with a permanent curvature as originally formed, or, depending on the shape of the conduit concerned, may be a flat, planar member.

In some embodiments, the outward bending/flattening of the lower side walls of the pipe may be unnecessary in view of the shape of the conduit, or may not be desired owing to characteristics of the pipe material, structural requirements, costs, or other factors involved. In these cases, the gap at the bottom of the pipe may be formed by removing a section of the pipe wall, rather than just making a single cut, so as to form an opening of the desired width. The floor panel can then be mounted across this opening, and if the floor portion of the conduit is dished, the panel may be a "pre-curved" member such as have been described above, rather than relying on the resilient force of the pipe walls to bend the member to the desired shape; a rough approximation of the semi-elliptical shape can thus be achieved. Moreover, by removing a selected chord-wise section or segment from the pipe, the overall height and proportions of the resulting slipliner can be adjusted to match those of the conduit, whether or not the particular embodiment involves outward flexing of the side walls of the pipe.

FIG. 3E shows the semi-elliptical liner pipe 30 which results from the construction described above installed in a semi-elliptical conduit 10. As can be seen, the cylindrical top wall 84 of the liner conforms closely to the upper arch portion 14 of the conduit, while the relatively flatter lower wall portions 82a, 82b fit closely against the relatively vertical sidewall portions 16a, 16b. Finally, the outwardly curved floor panel 42 rests more or less flush against the floor portion 18 of the conduit. As a result, gaps between the conduit and the exterior of the liner pipe are minimized, so that the size of the bore 80 which is provided by the liner is reduced from that of the original bore 12 (see FIG. 1A) by little more than the thickness of the liner material. Thus, the present invention permits semi-elliptical sewer lines, water lines, and other conduits to be renovated by means of a sliplining process, with minimal reduction in flow capacity; in fact, because the smooth sided bore of the new liner produces higher flow rates as compared with the original masonry conduit, if the slipliner/conduit match is close enough there will often be no appreciable reduction in flow capacity. Moreover, an additional benefit of the close fit between the two members is that a minimum amount of grout material is required to fill the annulus.

c. Irregular Semi-Elliptical Conduits

The foregoing discussion has presented the present invention in the context of the more common type of semi-elliptical mainstream conduit, which has the characteristic inverted "U" shape. However, a large number of more irregular tunnels and lines of this general type also exist, which class will be referred to herein as irregular semi-elliptical conduits.

FIG. 5A shows one type of irregular semi-elliptical conduit 90 which is sometimes encountered, this being commonly referred to by those skilled in the art as an "egg-shaped" line. As is implied by its name, this conduit is roughly egg-shaped in cross section, with a relatively broad, cylindrical upper arch portion 92, flattened and somewhat inwardly sloped sidewall portions 94a, 94b, and a strongly curved, substantially cylindrical bottom channel portion 96 which is somewhat narrower than the upper arch. For the purposes of the present invention, these elements can be considered as corresponding to the arch portion 14, sidewall portions 16a, 16b, and the bottom wall portion 18 of the more traditional semi-elliptical conduit 10, and can therefore be dealt with in a manner analogous to that described above.

Accordingly, the slipliner 100 which is configured to match this conduit comprises an upper pipe portion 102 and a lower floor panel portion 104. The main difference between this embodiment and those described above is that the floor panel 104 is of a more deeply curved, generally cylindrical shape so as to match the channel portion 96 of conduit 90. As was noted above, a longitudinal section cut from a pipe having the appropriate diameter may be used to provide a permanently curved floor panel which matches the floor of a conduit; therefore, in the embodiment which is illustrated in FIGS. 5A–5C, the generally cylindrical floor panel is provided by constructing the panel from a segment of pipe from which a relatively narrow section has been cut, so that the pipe wall remains intact over most of its circumference.

Thus, as can be seen in FIG. 5B, the upper pipe portion 102 is formed in a manner similar to that described above, by making the first and second cuts so as to form an opening 106 having a width "d". The deeply curved, cylindrical floor panel, in turn, is formed by cutting a relatively narrower section from the upper edge of a second segment of pipe so as to form a gap 108 having a second width "d'", the wall of the pipe remaining intact over most of its circumference so as to form a "C" shape in cross section. In embodiment which is illustrated, the diameter of the pipe forming the floor panel portion 104 is significantly smaller than that which provides the upper pipe portion 102 (the bottom channel of the conduit 90 being significantly narrower than the upper arch portion); it will be understood, however, that the lower pipe may be equal or larger in diameter than the upper, depending on the size and shape of the conduit which is to be renovated.

In the embodiment which is illustrated, the width "d'" of the opening in the upper edge of the floor panel 104 is sized significantly larger than the width "d" of the opening in the upper pipe portion, the width "d" of the upper opening also being sized smaller than the diameter of the pipe from which the floor panel is formed. Thus, as is indicated by arrows 110a, 110b in FIG. 5B, the lower sidewall portions 112a, 112b of the upper pipe portion must be bent outwardly in order for the edges of the cylindrical floor panel to be received in the gap 106.

As can be seen in FIG. 5C, this results in the sidewall portions 112a, 112b being flattened somewhat so as to provide a shape which corresponds to the wall portions 94a, 94b of the conduit 90; owing to the smaller diameter of the lower pipe portion (in the embodiment which is illustrated), these wall portions also taper inwardly and downwardly so as to match the wall portions of the egg-shaped conduit.

In the embodiment which is illustrated, the lower edges 114a, 114b of the upper pipe portion are received in longitudinal notches 116a, 116b which formed in the outer surface 118 of the floor panel 104, thus securing the assembly together. It will be understood, however, that this is simply one exemplary structure for mounting the edges of the two pipe pieces together, and other suitable joint structures, such as the lap, tongue-and-groove, and butt joints described above may be used in various embodiments. Following assembly, the joints between the two members are sealed by welding or other suitable means, such as those described above, so as to form the enclosed bore 120.

Thus, the upper pipe portion 102, with its larger diameter, provides the larger arch portion 122 of the slipliner which matches the larger arch portion 92 of the conduit 90, while the smaller diameter pipe which forms the lower panel 104 provides a smaller arch portion 124 which fits the bottom channel 96. The flattened wall portions 112a, 112b, in turn, correspond to the inwardly sloped walls 94a, 94b of the conduit.

It will be understood that variations on the above-described construction may be employed to construct slipliners which are particularly configured for installation in irregular semi-elliptical conduits having a wide variety of shapes, in addition to the exemplary "egg" shape which has been described above.

Having thus provided a description of the invention in its preferred embodiments, it will be understood that many modifications thereto and variations thereon will be obvious to those skilled in the art without departing from the basic spirit thereof. Accordingly, the present invention is not to be limited except as by the appended claims.

What is claimed is:

1. A method for forming a slipliner for renovating a semi-elliptical conduit having a generally cylindrical top wall, generally vertical side walls, and a generally horizontal bottom wall, said method comprising the steps of:

providing a substantially cylindrical liner pipe formed of a semi-rigid, resiliently flexible material;

forming a longitudinal cut along a bottom portion of said liner pipe;

spreading said pipe apart along said cut so as to form a gap of predetermined width between first and second edges of said pipe;

inserting a generally horizontal floor panel having said predetermined width of said gap between said edges of said pipe; and mounting said first and second edges of said pipe to first and second edges of said floor panel, so that said floor panel provides a bottom surface which corresponds to said generally horizontal bottom wall of said conduit, and lower sidewall portions of said pipe which are adjacent to said floor panel are bent outwardly so as to correspond to said generally vertical sidewall portions of said conduit while an upper portion of said pipe remains substantially cylindrical so as to correspond to said cylindrical top wall portion of said conduit.

2. The method of claim 1, wherein said bottom wall of said conduit is downwardly curved toward a middle portion thereof, and the step of inserting said generally planar floor panel between said edges of said pipe comprises:

providing a said generally planar floor panel having a selected degree of flexibility such that said floor panel bows downwardly in response to an inwardly directed force exerted between said edges of said pipe so that said panel has a curvature which corresponds to said downwardly curved bottom wall of said conduit.

3. The method of claim 1, wherein the step of mounting said edges of said floor panel to said pipe comprises:

providing each said edge of said panel with a joint structure for engaging a corresponding edge of said pipe.

4. The method of claim 3, wherein the step of providing each said edge of said floor panel with a joint structure comprises:

providing each said edge of said panel with a groove for receiving a corresponding edge of said pipe in engagement therewith.

5. The method of claim 3, wherein the step of providing each said edge of said panel with a joint structure comprises:

providing each said edge of said panel with a slip lock joint for engaging a corresponding slip lap joint formed on said corresponding edge of said pipe.

6. The method of claim 3, wherein the step of providing each said edge of said panel with a joint structure comprises:

providing each said edge of said panel with a tongue-and-groove joint member for engaging a corresponding tongue-and-groove joint member formed on said corresponding edge of said pipe.

7. The method of claim 1, wherein the step of providing said generally planar floor panel comprises:

casting said floor panel as a unit.

8. The method of claim 1, wherein the step of providing said generally planar floor panel comprises:

extruding said floor panel through a die and cutting said panel to a desired length.

9. The method of claim 1, wherein the step of providing said generally planar floor panel comprises:

cutting said panel to a desired size from a sheet of material.

10. The method of claim 4, wherein the step of providing each said edge of said floor panel with a groove for receiving an edge of said pipe comprises:

milling a said groove in each said edge of said floor panel.

11. The method of claim 4, wherein the step of providing each said edge of said floor panel with a groove for receiving an edge of said pipe comprises:

extruding said panel through a die configured to form said grooves along said edges of said panel.

12. The method of claim 4, wherein the step of providing each said edge of said floor panel with a groove for receiving an edge of said pipe comprises:

casting said panel in a mold configured to form said grooves along said edges of said panel.

13. The method of claim 4, wherein the step of providing each said edge of said floor panel with a groove for receiving an edge of said pipe comprises:

mounting a separate channel strip along each said edge of said floor panel, said channel strip having said groove formed therein for receiving an edge of said pipe.

14. The method of claim 3, further comprising the step of:

sealing said edges of said pipe to said edges of said floor panel so as to form a fluid-tight bore within said slipliner.

15. The method of claim 1, wherein the step of providing said pipe comprises:

selecting a pipe formed of a material having a predetermined degree of flexibility such that said lower wall portions of said pipe will be bent outwardly by said floor panel to have a curvature which corresponds to a curvature of said sidewall portions of said semi-elliptical conduit.

16. The method of claim 15, wherein the step of forming said cut along said pipe comprises:

cutting a longitudinal section from said pipe, said longitudinal section having a predetermined width such that after mounting of said floor panel to said edges along said cut, said slipliner will have a predetermined height and width which correspond to a height and width of said conduit.

17. The method of claim 1, wherein the step of providing a liner pipe formed of semi-rigid, resiliently flexible material comprises:

providing a substantially cylindrical liner pipe formed of fiberglass.

18. The method of claim 1, wherein the step of providing a liner pipe formed of a semi-rigid, resiliently flexible material comprises:

providing a substantially cylindrical liner pipe formed of PVC.

19. The method of claim 1, wherein the step of providing a liner pipe formed of a semi-rigid, resiliently flexible material comprises:

providing a substantially cylindrical liner pipe formed of HDPE.

20. A slipliner for renovating a semi-elliptical conduit having a generally cylindrical top wall, generally vertical side walls, and a generally horizontal bottom wall, said slipliner comprising:

a substantially cylindrical liner pipe formed of a semi-rigid, resiliently flexible material and having a cut formed along a bottom portion thereof; and a generally horizontal floor panel mounted across said bottom portion of said pipe between first and second edges of said pipe along said cut so that said edges are spread apart by a predetermined distance;

so that said floor panel provides a bottom surface which corresponds to said generally horizontal bottom wall of said conduit, and lower sidewall portions of said pipe which are adjacent to said floor panel are bent outwardly so as to correspond to said generally vertical sidewall portions of said conduit while an upper portion of said pipe remains substantially cylindrical so as to correspond to said cylindrical top wall portion of said conduit.

21. The slipliner of claim 20, further comprising:

channel means mounted to a first and second edges of said floor panel for receiving said edges of said pipe in engagement therewith.

22. The slipliner of claim 21, wherein said floor portion of said conduit is curved downwardly toward a middle portion thereof, and said floor panel is bowed outwardly by a force which is applied inwardly between said spread-apart edges of said resilient pipe, so that said floor panel has a curvature which corresponds to said downwardly curved floor portion of said conduit.

23. The slipliner of claim 22, wherein said floor portion of said conduit is curved downwardly toward a middle portion thereof, and said floor panel is formed with a permanent curvature which corresponds to said downwardly curved floor portion of said conduit.

24. The slipliner of claim 22, wherein said floor panel which is formed with a permanent curvature comprises:

a longitudinal section cut from a segment of pipe having circular wall which corresponds to said downwardly curved portion of said conduit.

25. The slipliner of claim 21, wherein said liner pipe formed of semi-rigid, resiliently flexible material comprises:

a cylindrical liner pipe formed of fiberglass material.

26. The slipliner of claim 21, wherein said liner pipe formed of a semi-rigid resiliently flexible material comprises:

a cylindrical liner pipe formed of a PVC material.

27. The slipliner of claim 21, wherein said liner pipe formed of a semi-rigid resiliently flexible material comprises:

a cylindrical liner pipe formed of a HDPE material.

28. A renovated water line, sewer line or like structure, comprising:

a semi-elliptical conduit having a generally cylindrical top wall portion, generally vertically extending sidewall portions, and a generally horizontal bottom wall portion; and a slipliner installed in said semi-elliptical conduit, said slipliner comprising:

a substantially cylindrical liner pipe formed of a semi-rigid, resiliently flexible material and having a cut formed along a bottom portion thereof; and a generally horizontal floor panel mounted across said bottom portion of said pipe between first and second edges of said pipe along said cut so that said edges are spread apart by a predetermined distance;

so that said floor panel provides a bottom surface which corresponds to said generally horizontal bottom wall of said conduit, and lower sidewall portions of said pipe which are adjacent to said floor panel are bent outwardly so as to correspond to said generally vertical sidewall portions of said conduit while an upper portion of said pipe remains substantially cylindrical so as to correspond to said cylindrical top wall portion of said conduit.

\* \* \* \* \*